US012333746B2

(12) United States Patent
Chien et al.

(10) Patent No.: US 12,333,746 B2
(45) Date of Patent: Jun. 17, 2025

(54) METHOD FOR ESTIMATING DEPTH, ELECTRONIC DEVICE, AND STORAGE MEDIUM

(71) Applicant: HON HAI PRECISION INDUSTRY CO., LTD., New Taipei (TW)

(72) Inventors: Yu-Hsuan Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 398 days.

(21) Appl. No.: 17/955,884

(22) Filed: Sep. 29, 2022

(65) Prior Publication Data

US 2023/0394692 A1 Dec. 7, 2023

(30) Foreign Application Priority Data

Jun. 2, 2022 (CN) .......................... 202210624024.9

(51) Int. Cl.
*G06T 7/521* (2017.01)
*G01S 13/08* (2006.01)
*G01S 13/86* (2006.01)
*G01S 13/89* (2006.01)

(52) U.S. Cl.
CPC .............. *G06T 7/521* (2017.01); *G01S 13/08* (2013.01); *G01S 13/867* (2013.01); *G01S 13/89* (2013.01); *G06T 2207/10028* (2013.01); *G06T 2207/20081* (2013.01); *G06T 2207/20084* (2013.01); *G06T 2207/30261* (2013.01)

(58) Field of Classification Search
CPC ........... G06T 7/521; G06T 2207/10028; G06T 2207/20081; G06T 2207/20084; G06T 2207/30261; G06T 7/50; G01S 13/08; G01S 13/86; G01S 13/46; G01S 13/867; G01S 13/89; G01S 13/931
See application file for complete search history.

(56) References Cited

U.S. PATENT DOCUMENTS

| 8,824,827 | B2* | 9/2014 | Quan | ...................... | H04N 23/61 |
| | | | | | 382/167 |
| 10,861,176 | B2* | 12/2020 | Tong | ...................... | G01S 13/931 |
| 11,012,631 | B2* | 5/2021 | Fujisawa | ................ | H04N 23/00 |
| 11,043,009 | B2* | 6/2021 | Wang | ...................... | G01S 7/497 |
| 11,258,957 | B2* | 2/2022 | McElvain | ............... | H04N 23/73 |
| 11,734,861 | B2* | 8/2023 | Goyal | .................. | G06V 20/647 |
| | | | | | 345/634 |

(Continued)

FOREIGN PATENT DOCUMENTS

| CN | 111179331 A | * | 5/2020 | ............... G06T 7/55 |
| CN | 112292711 | | 1/2021 | |

(Continued)

*Primary Examiner* — Stephen R Koziol
*Assistant Examiner* — Benedict E Lee
(74) *Attorney, Agent, or Firm* — ScienBiziP, P.C.

(57) ABSTRACT

A method for estimating depth implemented in an electronic device includes obtaining a first image; inputting the first image into a depth estimation model, and obtaining a first depth image; obtaining a depth ratio factor, the depth ratio factor indicating a relationship between a relative depth and a depth of each pixel in the first depth image; and obtaining depth information of the first depth image according to the first depth image and the depth ratio factor.

17 Claims, 6 Drawing Sheets

(56) References Cited

U.S. PATENT DOCUMENTS

| | | | | |
|---|---|---|---|---|
| 2017/0230558 A1* | 8/2017 | Morales | | H04N 25/61 |
| 2020/0195828 A1* | 6/2020 | Reyserhove | | H04N 25/533 |
| 2023/0394680 A1* | 12/2023 | Mariotti | | G06T 7/20 |
| 2024/0394893 A1* | 11/2024 | Qi | | G06T 7/11 |

FOREIGN PATENT DOCUMENTS

| | | | | | |
|---|---|---|---|---|---|
| CN | 112292711 A | * | 1/2021 | | G05D 1/0212 |
| CN | 113177975 A | * | 7/2021 | | G06T 17/00 |
| CN | 113298785 A | * | 8/2021 | | |
| CN | 114022531 A | * | 2/2022 | | |
| WO | WO-2021004262 A1 | * | 1/2021 | | G06T 7/50 |

* cited by examiner

METHOD FOR ESTIMATING DEPTH, ELECTRONIC DEVICE, AND STORAGE MEDIUM

FIELD

The subject matter herein generally relates to computer vision, and particularly to an electronic device, a method for estimating depth, and a storage medium.

BACKGROUND

The electronic device can capture images of objects through a binocular stereo camera which includes two cameras, the common features in the images captured by the two cameras can be recognized, the disparities of the two cameras for the common features can be calculated, the depth of the object can be calculated according to the disparity and the distance between the two cameras, the depth is a vertical distance from the object to the line connecting the two cameras. However, if the distance between the two cameras is not known, or if a monocular camera is used, the depth of the target object cannot be calculated.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that elements or articles appearing before such terms cover elements or articles listed after the words and their equivalents without excluding other elements or articles. The terms "connect", "link" or the like are not limited to physical or mechanical connection, but may include electrical connections, whether direct or indirect.

Depth estimation of images is an indispensable technology in the field of computer vision, which can be used in autonomous driving, scene understanding, robotics, 3D reconstruction, photography, intelligent medicine, intelligent human-computer interaction, space mapping, augmented reality and other fields. For example, in autonomous driving, depth information from images can be used to aid sensor fusion, drivable space detection, and navigation.

The method for estimating depth provided in the embodiment is applied in an automatic driving scenario. It can be understood that the method for estimating depth is not limited to be applied to the automatic driving scenario.

Figure 1:
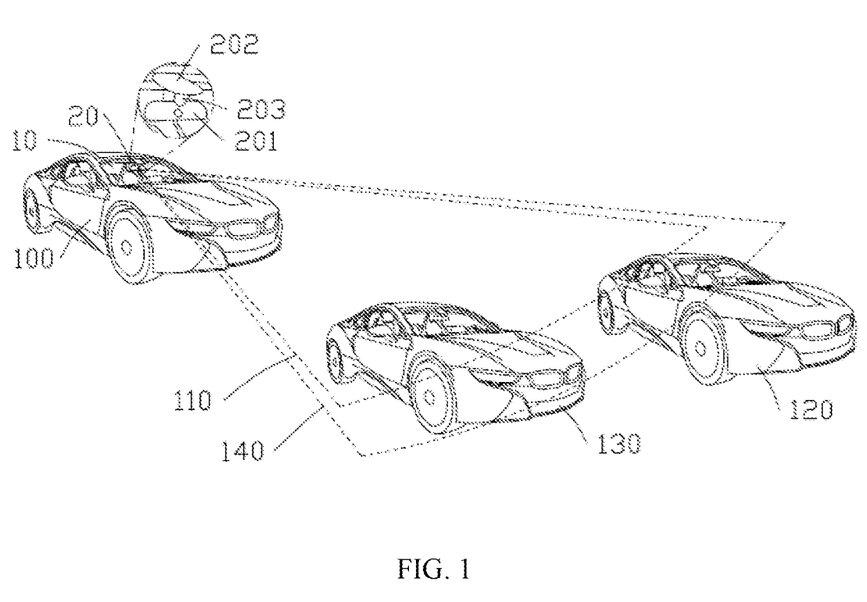
FIG. 1 is a schematic view of an embodiment of application environment of a method for estimating depth according to the present disclosure.

Referring to FIG. 1, a vehicle 1 includes a depth estimation system 20. The depth estimation system 20 is arranged in an interior compartment behind a windshield 10 of the vehicle 100. The depth estimation system 20 includes a camera device 201, a distance acquisition device 202, and a processor 203. The processor 203 is coupled with the camera device 201 and the distance acquisition device 202.

It can be understood that the camera device 201, the distance acquisition device 202, and the processor 203 can be arranged in other positions on the vehicle 100, and the camera device 201 can capture images of the view in front of the vehicle 100, the distance acquisition device 202 can detect the distance between the object in front of the vehicle 100 and the vehicle 100. For example, the camera device 201 and the distance acquisition device 202 may be located in the metal grille or front bumper of the vehicle 100. Further, although FIG. 1 shows only one distance acquisition device 202, the vehicle 100 may have a number of distance acquisition devices 202 in different directions (e.g., side, front, rear, etc.). The distance acquisition devices 202 may also be arranged at positions such as windshields, door panels, bumpers, or metal grilles.

In one embodiment, the camera device 201 on the vehicle 100 can capture images of scenes in front of and on both sides of the vehicle 100. As illustrated in FIG. 1, in a horizontal coverage area 110 (shown by dashed lines) that can be detected by the camera device 201, there are two objects, a vehicle 120 and a vehicle 130. The camera device

201 can capture images of the vehicle 120 and the vehicle 130 in front of the vehicle 100.

In some embodiments, the camera device 201 may be a binocular camera or a monocular camera. In some embodiments, the camera device 201 may be implemented as an automobile data recorder. The automobile data recorder is used to record information such as images and sounds during travelling of the vehicle 100. After the vehicle 100 is installed with the automobile data recorder, the automobile data recorder can record the images and sounds of the entire driving process of the vehicle 100, thereby providing effective evidence for traffic accidents. For example, in addition to the above functions, the functions provided by the automobile data recorder may also include functions such as global positioning system (GPS), driving track capture, remote monitoring, electronic dog, navigation, etc., which is not specifically limited.

The distance acquisition device 202 may be used to detect objects in front of and on both sides of the vehicle 100, and obtain the distance between the object and the distance acquisition device 202. As shown in FIG. 1, the distance acquisition device 202 on the vehicle 100 may obtain the distance between the vehicle 120 and the distance acquisition device 202, and the distance between the vehicle 130 and the distance acquisition device 202. The distance acquisition device 202 may be an infrared sensor, a Lidar, a Radar, or the like.

For example, the distance acquisition device 202 can be a radar, the radar utilizes radio frequency (RF) waves to determine the distance, direction, speed, and/or height of objects in front of the vehicle. In detail, a radar includes a transmitter and a receiver, the transmitter transmits RF waves (e.g., radar signals), and the RF waves will be reflected when encountering objects on the path. RF waves reflected by the object return a small fraction of energy to the receiver. As shown in FIG. 1, the radar is configured to transmit radar signals through the windshield in the horizontal coverage area 140 and to receive radar signals reflected by any object within the horizontal coverage area 140, so as to receive a 3D point cloud image of any object.

In one embodiment, the horizontal coverage area 110 and the horizontal coverage area 140 may completely or partially overlap, or an overlap area is formed between the horizontal coverage area 110 and the horizontal coverage area 140 (i.e., the horizontal coverage area 140 shown in FIG. 1). When a size of the overlap area reaches a threshold, the camera device 201 and the radar can both capture images of the same scene after the capturing direction is determined.

In some embodiments, the camera device 201 may capture images of the scene within the horizontal coverage area 110 every preset time period. Likewise, the radar may capture the three-dimensional point cloud images of the scene within the horizontal coverage area 140 every preset time period. The time period of the camera device 201 and the radar for capturing images may be the same or different. The images and three-dimensional point cloud images captured by each camera device 201 may be marked with a timestamp. When the time period of the camera device 201 and the radar for capturing the images are different, the timestamps can be used to simultaneously or nearly simultaneously select the captured image and the 3D point cloud image for further processing (e.g., image fusion).

The three-dimensional point cloud, also known as the laser point cloud (PCD) or point cloud, can be a series of point sets for reflecting spatial distribution and surface features of target obtained by obtaining a three-dimensional spatial coordinates of each sampling point on the surface of the object under the same spatial reference system using the laser. Compared with the image, the three-dimensional point cloud includes more three-dimensional space information, that is, the distance information between the object and the distance acquisition device 202 is included.

For example, as shown in FIG. 1, at time T0, the camera device 201 may capture images of the vehicle 120 and the vehicle 130. At the same time (i.e., time T0), the distance acquisition device 202 can also obtain the three-dimensional point cloud image within the horizontal coverage area 140, that is, the distance information between the vehicle 120 and the distance acquisition device 202, and the distance information between the vehicle 130 and the distance acquisition device 202 are obtained at the time T0.

In one embodiment, the processor 203 may recognize depth information of objects in the captured scene based on the image of the scene captured by the camera device 201 at the same time and the distance information of the same scene captured by the distance acquisition device 202. The objects may be other vehicles, pedestrians, road signs or obstacles.

It can be understood that the structure illustrated in the embodiment does not constitute a specific limitation on the depth estimation system. In other embodiments, the depth estimation system may include more or fewer components than shown, or some components may be combined, or some components may be split, or a different arrangement of components.

Figure 2:
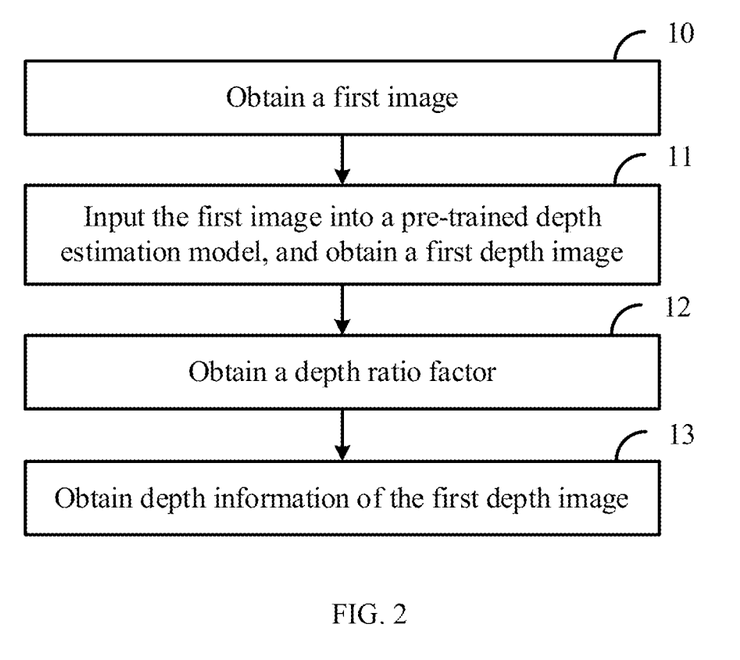
FIG. 2 illustrates a flowchart of an embodiment of a method for estimating depth according to the present disclosure.

FIG. 2 illustrates a flowchart of an embodiment of a method for estimating depth, the method for estimating depth can be applied in the depth estimating system 20. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 10.

At block 10, obtaining a first image.

In one embodiment, the depth estimation system 20 may obtain the first image captured by the camera device. For example, the camera device can be a monocular camera, the monocular camera can record a video, and the depth estimation system cuts out an image frame from the video as the first image. The monocular camera can also capture an image, and the captured image is used as the first image.

At block 11, inputting the first image into a pre-trained depth estimation model, and obtaining a first depth image.

In some embodiments, after the depth estimation system inputs the first image into the depth estimation model, the depth estimation model outputs a disparity map corresponding to the first image, and converts the disparity map to the first depth image. The method for converting the disparity map to the depth image is prior art, which will not repeat here.

In some embodiments, the depth estimation model is pre-trained, the depth estimation model processes the first image and obtains the depth image corresponding to the first image. The depth estimation model may be an autoencoder (AE) network.

An autoencoder is an Artificial Neural Network (ANN) used in semi-supervised learning and unsupervised learning, the autoencoder takes input information as a learning target, and performs representation learning on the input information. The autoencoder includes an encoder and a decoder. According to a learning paradigm, autoencoders can be divided into contractive autoencoders, regularized autoencoders, and variational autoencoders (VAE). Depending on the type of construction, the autoencoder can be a neural network with a feedforward structure or a recursive structure.

Figure 3:
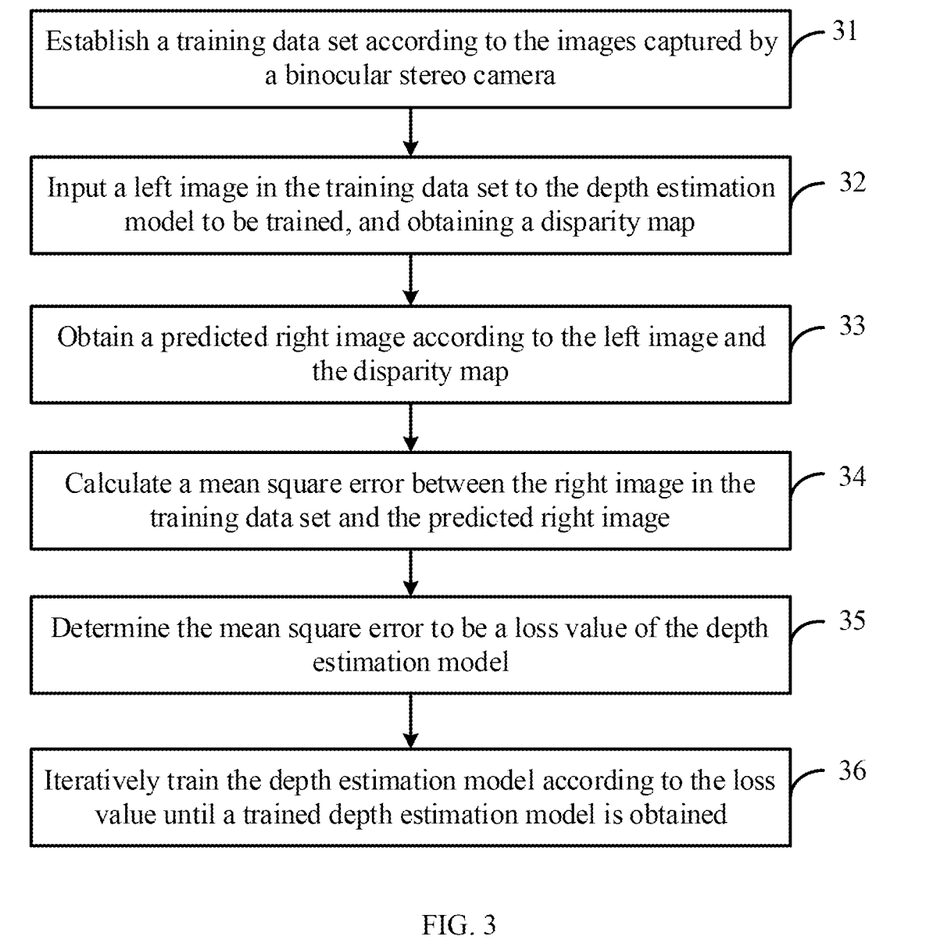
FIG. 3 illustrates a flowchart of an embodiment of a method for training a depth estimation model according to the present disclosure.

The training method of the depth estimation model is described in detail below. FIG. 3 illustrates a flowchart of an embodiment of a method for training a depth estimation model. The method is provided by way of example, as there are a variety of ways to carry out the method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 31.

At block 31, establishing a training data set according to the images captured by a binocular stereo camera.

In one embodiment, the images captured by the binocular stereo camera are obtained during travelling of the vehicle, and the training data set is established according to the images, and the training data set is used to train the depth estimation model.

The binocular camera includes a first camera and a second camera, and the images captured by the binocular camera include the images of the same scene (or object) captured at the same time, that is, include a left image captured by the first camera and a right image captured by the second camera. The left image and the right image are images of the same scene captured at the same time.

At block 32, inputting a left image in the training data set to the depth estimation model to be trained, and obtaining a disparity map.

It is understood that human can perceive the stereo condition through both eyes because there is a horizontal difference in the imaging position of the same object in the three-dimensional space between the left and right eyes, the horizontal difference is the disparity The disparity map is based on an image in the stereo image pair, the size of the disparity map is the same as the size of the reference image, and the element value of the disparity map is the disparity value, the disparity estimation is the process of determining the corresponding pixels between the left and right images, that is, is the stereo matching process.

At block 33, obtaining a predicted right image according to the left image and the disparity map.

In one embodiment, the predicted right image is obtained by adding the left image and the disparity map, the predicted right image is determined by the depth estimation model.

At block 34, calculating a mean square error between the right image in the training data set and the predicted right image.

At block 35, determining the mean square error to be a loss value of the depth estimation model.

At block 36, iteratively training the depth estimation model according to the loss value until a trained depth estimation model is obtained.

For example, the training data set includes the images captured by the binocular camera, and the left image A and the right image B are the images captured at the same time by the first camera and the second camera on the binocular camera, respectively. The left image A is input to the autoencoder network, and the autoencoder network outputs the disparity map. The predicted right image C predicted by the autoencoder network is obtained by adding the left image A and the disparity map, and a Mean Squared Error (MSE) between the predicted right image C and the actual right image B is calculated as the loss value of the autoencoder, and the autoencoder network is iteratively trained according to the loss value until the trained autoencoder network is obtained.

In one embodiment, the mean square error is a mean value of the sum of squares of the deviations between each data and the corresponding true value. The mean square error is calculated according to the following formula:

$$MSE = \frac{1}{n}\sum_{i=1}^{n}(y_i - y_i')^2. \quad \text{(formula (1))}$$

In the formula 1, MSE is the mean square error, n is the number of samples, $y_i$ is the data fitted by the real data $y_i'$, that is, $y_i'$ is the data of the actual right image B, and $y_i$ is the data of the predicted right image C.

In one embodiment, the pixel value (or gray value) of each pixel in the first depth image represents a relative depth. In some embodiments, the relative depth indicates a logical relationship between pixels. The pixel value of each pixel in the first depth image is not an actual depth value, that is, the pixel value of each pixel is not the absolute value provided according to a specified measurement unit (such as meters or centimeters). The depth value of the pixel is the distance between the real object corresponding to the pixels and the camera device or a reference plane, that is, the depth value of the pixel is a vertical distance between the real object corresponding to the pixel and the camera device.

In other words, the pixel value of each pixel in the first depth image is not the distance between the real object corresponding to the pixel and the camera device or the reference plane. Therefore, the depth value of each pixel in the first depth image is calculated by combining other parameters such as the distance between the first camera and the second camera. The depth values of pixels in the first depth image form the depth information of the first depth image.

For a monocular camera (i.e., a single camera), the distance between each feature on the object and the monocular camera (i.e., the depth value of the pixel) can be a vertical distance between the pixel of each feature on the object and the monocular camera.

At block 12, obtaining a depth ratio factor.

In one embodiment, obtaining a depth ratio factor includes: obtaining the distance information obtained by the distance acquisition device, and calculating the depth ratio factor according to the distance information. The depth ratio factor represents a relationship between a relative depth of a pixel in the depth image obtained in block 11 and the depth value of the pixel. The depth value corresponding to the pixel can be obtained by multiplying the pixel value of the pixel in the first depth image by the depth ratio factor.

In some embodiments, the depth ratio factor may be calculated by using radar information (depth information with a mathematical unit) obtained by the radar. For example, the point detected by the radar is converted to the corresponding pixel in the depth image, the depth image includes the images of the same scene detected by the radar at the same time. For a pixel in the depth image, a depth ratio relationship of the pixel is calculated according to the distance information of the pixel provided by the radar and the relative depth (such as a pixel value) of the pixel provided in the depth image. The depth ratio relationships corresponding to all pixels in the depth image are obtained, and the depth ratio factor is calculated according to the depth ratio relationships.

In one embodiment, the depth ratio factor may be calculated according to pre-obtained training data, or may be obtained according to the first image and the 3D point cloud image corresponding to the first image when the first image is obtained.

The method for calculating the depth ratio factor according to the pre-obtained training data will be specifically described below.

Figure 4:
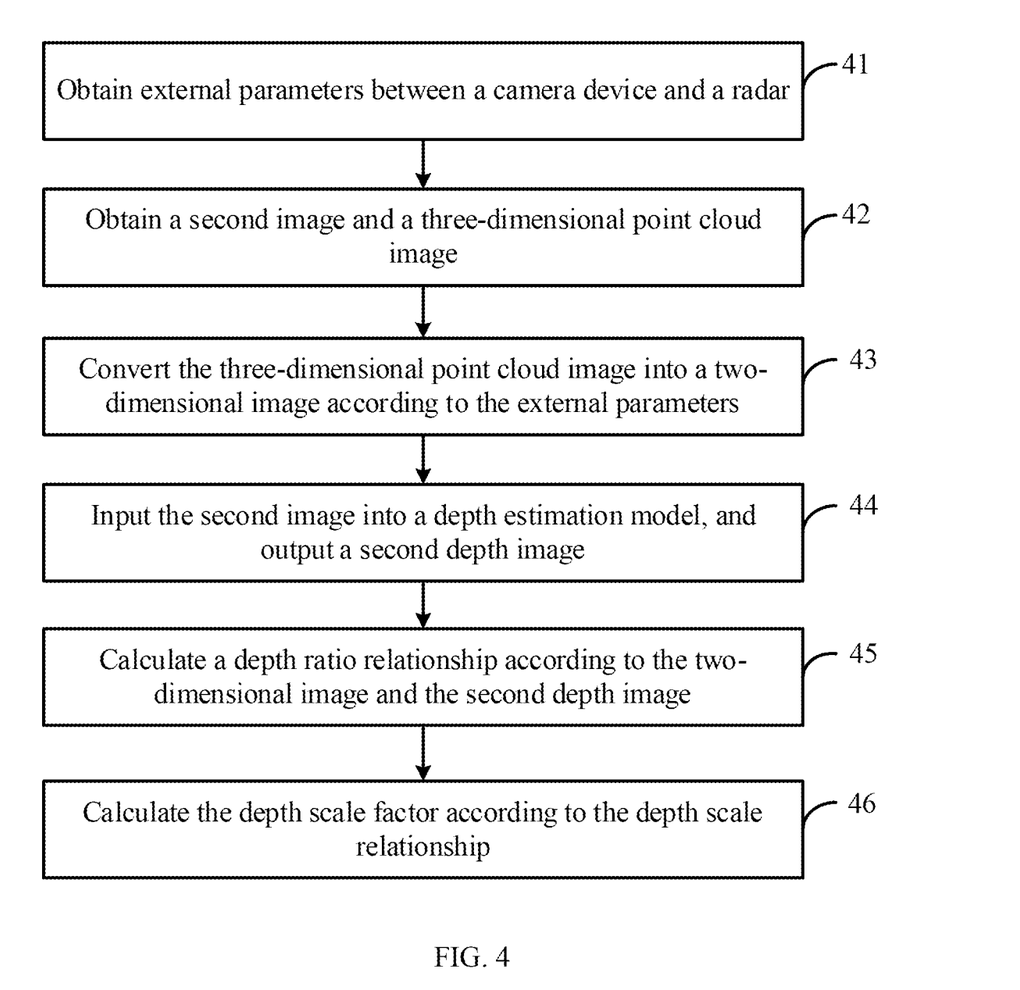
FIG. 4 illustrates a flowchart of an embodiment of a method for obtaining a depth ratio factor according to the present disclosure.

For example, the distance acquisition device is a radar, referring to FIG. 4, a flowchart of a method for obtaining a depth ratio factor is illustrated.

At block 41, obtaining external parameters between the camera device and the radar.

In one embodiment, the position relationship between the camera device and the radar can be determined in advance, for example, the camera device can be arranged under the radar, and the positions of the camera device and the radar are fixed, and a calibration plate can be arranged within the overlapping area (e.g., horizontal coverage area 110 as shown in FIG. 1) between the field of view of the camera device and the field of view of the radar. The surface of the calibration plate can be a checkerboard.

Before determining the external parameters between the camera device and the radar, a number of calibration images are captured by the radar and camera device with a fixed position as the input data. When the radar or camera device captures the number of calibration images, the calibration images are input into the processor, the processor processes the calibration images, and determines the external parameters.

For example, the camera device captures two-dimensional images of the calibration plate with a number of poses, and sends the captured two-dimensional images to the processor. The number of poses are different poses. The radar captures 3D point cloud images of the calibration plate with a number of poses, and sends the captured 3D point cloud images to the processor. The processor takes the two-dimensional image and three-dimensional point cloud image of the calibration plate with the same pose captured by the camera device and the radar, as a group of calibration images, and determines the external parameters between the camera device and the radar according to a number of groups of calibration images.

It can be understood that the method for obtaining the external parameters between the camera device and the radar is prior art, which will not be repeated here.

In some embodiments, the external parameter may be stored in the storage device, and the processor may obtain the external parameters from the storage device. In other embodiments, the external parameter may also be stored in the processor.

At block 42, obtaining a second image and a three-dimensional point cloud image.

In one embodiment, obtaining a second image includes: capturing an image of a target scene by the camera device in advance and obtaining the second image, and at the same time, obtaining the 3D point cloud image by scanning the target scene by the distance acquisition device. That is, the second image and the three-dimensional point cloud image obtained in block 42 are the images of the same target scene captured by the camera device and the distance acquisition device at the same time, respectively.

For example, the second image is an image of the front scene (including the vehicle 120 and the vehicle 130) captured by the camera device on the vehicle 100 at time T0, and the three-dimensional point cloud image is obtained by scanning the front scene (including vehicle 120 and vehicle 130) by the radar on the vehicle 100 at time T0.

In other embodiments, the camera device captures the second image of the scene within the horizontal coverage area 110 of the camera device every preset time period, and the radar capture the 3D point cloud image of the scene within the horizontal coverage area 140 of the radar every preset time period. The timestamps on the second image and the three-dimensional point cloud image are obtained, and the second image and the three-dimensional point cloud image with the same timestamp are selected.

At block 43, converting the three-dimensional point cloud image into a two-dimensional image according to the external parameters.

In one embodiment, converting the three-dimensional point cloud image into a two-dimensional image according to the external parameters includes: projecting the point cloud data in the three-dimensional point cloud image according to the external parameters, and obtaining the corresponding two-dimensional image, the pixel value of each pixel on the two-dimensional image is the depth value. The method for converting the three-dimensional point cloud image into the two-dimensional image according to external parameters is prior art, which will not be repeated here.

It should be noted that, when the second image and the three-dimensional point cloud image are obtained in block 42, the position relationship between the camera device and the radar is consistent with the position relationship between the radar and the camera device when obtaining the external parameters. That is, when the camera device is arranged under the radar when obtaining the external parameters, then when the second image and the three-dimensional point cloud image are obtained in block 42, the position relationship between the camera device and the radar is that the camera device is arranged under the radar.

At block 44, inputting the second image into the depth estimation model, and outputting a second depth image.

The depth estimation model in block 44 is the depth estimation model in the block 11.

At block 45, calculating a depth ratio relationship according to the two-dimensional image and the second depth image.

It should be noted that each pixel in the two-dimensional image can correspond to a pixel in the second depth image. That is, for a point a on an object in a real scene, it appears as a pixel point a1 in the two-dimensional image, and appears as a pixel point a2 in the second depth image, the pixel point a1 corresponds to the pixel point a2.

In one embodiment, each pixel in the two-dimensional image has a depth value, and each pixel in the second depth image has a relative depth. For example, a group of images includes a two-dimensional image and a second depth image, the three-dimensional point cloud image corresponding to the two-dimensional image and the second image corresponding to the second depth image are the images of the same scene obtained by the camera device and the distance acquisition device at the same time, respectively.

For example, a group of images includes a two-dimensional image a and a second depth image b, the second image corresponding to the second depth image b and the three-dimensional point cloud image corresponding to the two-dimensional image are images of the same target scene obtained at the same time. For point A in the target scene, the depth value of the point A in the two-dimensional image a is 10 m, and the relative depth in the second depth image b is 2, the depth ratio relationship of the point A can be calculated to be 10 cm/2=5 cm. The ratio relationships of all pixels in the two-dimensional image a and the second depth image b can be calculated by the same method, and a ratio relationship set (e.g., [5 cm , 6 cm , 5.5 cm, . . . , 5 cm]) is obtained, a mean value of the values in the ratio relationship set are calculated, and the mean value is the depth ratio relationship between the two-dimensional image a and the second depth image b.

At block 46, calculating the depth ratio factor according to the depth ratio relationship.

In one embodiment, the depth ratio factor is calculated according to the depth ratio relationships of a number of groups of images.

For example, for the same target scene, 100 groups of images are obtained, the 100 groups of images include 100 two-dimensional images and 100 second depth images. Accordingly, the depth ratio relationships of the 100 groups of images can be calculated. A mean value of the depth ratio relationships of the 100 groups of images is calculated, and the mean value is the depth ratio factor.

In one embodiment, for each pixel in the depth image, the distance between the pixel and the camera device is obtained, and the distance is taken as the depth value of the pixel. The ratio between the relative depth of the pixel point and the depth value of the pixel point can be calculated, to obtain the depth ratio relationship of the pixel point, and the depth ratio factor of the depth image is obtained according to the depth ratio relationship of the pixel point in the depth image.

The calculation of the depth ratio factor according to the first image and the three-dimensional point cloud image corresponding to the first image will be specifically described below.

The 3D point cloud image corresponding to the first image is the image scanned by the distance acquisition device, and the 3D point cloud image has the timestamp that is the same the timestamp of the first image, and the 3D point cloud image and the first image both are the images of the target scene.

In detail, obtaining a three-dimensional point cloud image corresponding to the first image scanned by the radar; obtaining external parameters between the camera device and the radar; convening the three-dimensional point cloud image according to the external parameters to a two-dimensional image, the two-dimensional image includes depth values. Calculating the depth ratio relationship according to the first image and the three-dimensional point cloud image corresponding to the first image, and calculating the depth ratio factor according to the depth ratio relationship, and the depth ratio factor is the depth ratio factor of the first image.

At block 13, obtaining depth information of the first depth image according to the first depth image and the depth ratio factor.

In one embodiment, the depth value corresponding to each pixel can be obtained by multiplying the pixel value of each pixel in the first depth image by the depth ratio factor, thereby calculating the depth values of all pixels in the first depth image. The depth values of all pixels in the first depth image can form the depth information of the first depth image.

In some embodiments, depth conversion is performed on the first depth image according to the depth ratio factor to obtain a third depth image, and each pixel in the third depth image has a corresponding depth value, that is, the pixel in the first depth image has a scale (or dimension), that is, has a unit.

Figure 5:
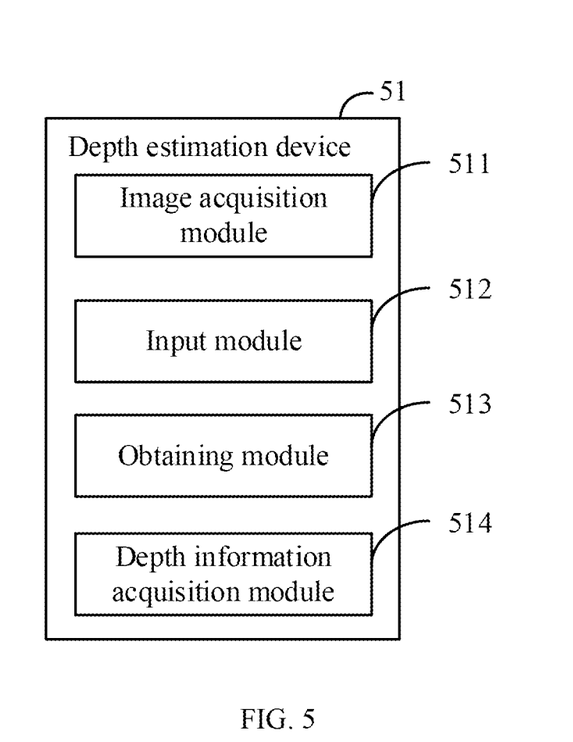
FIG. 5 is a block diagram of an embodiment of a depth estimation device according to the present disclosure.

Referring to FIG. 5, a depth estimation device 51 includes an image acquisition module 511, an input module 512, an obtaining module 513, and a depth information acquisition module 514. The modules 511-514 can be collections of software instructions stored in the storage device 61, and executed by the processor 62. The modules 511-514 also can include functionality represented as hardware or integrated circuits, or as software and hardware combinations, such as a special-purpose processor or a general-purpose processor with special-purpose firmware.

The image acquisition module 511 is used to obtain a first image.

The input module 512 is used to input the first image into a pre-trained depth estimation model, and obtain a first depth image.

The obtaining module 513 is used to obtain a depth ratio factor.

The depth information acquisition module 514 is used to obtain depth information of the first depth image according to the first depth image and the depth ratio factor.

Figure 6:
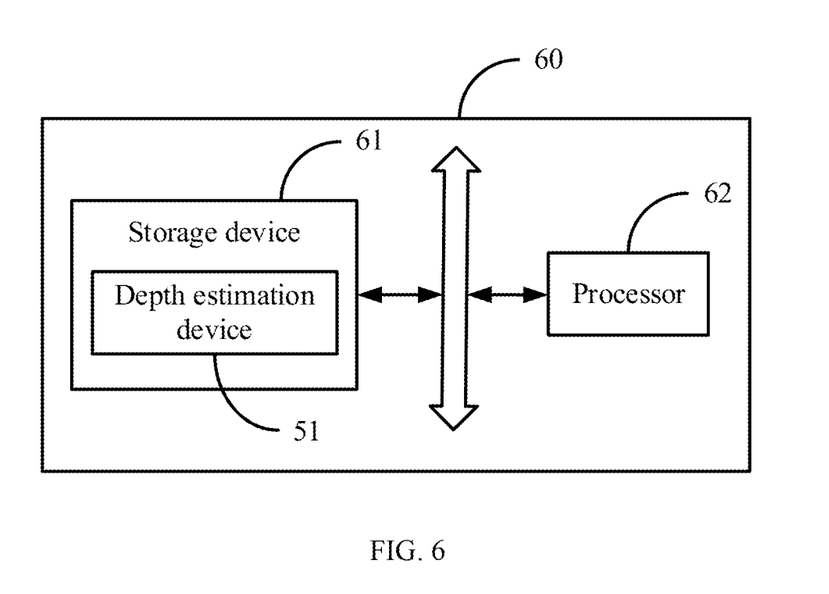
FIG. 6 is a block diagram of an embodiment of an electronic device according to the present disclosure.

FIG. 6 illustrates the electronic device 60 in one embodiment. The electronic device 60 includes, but is not limited to, a storage device 61, a processor 62, and a computer program. FIG. 6 illustrates only one example of the electronic device 60. Other examples can include more or fewer components than as illustrated or have a different configuration of the various components in other embodiments.

In one embodiment, the electronic device 60 can further include a camera device and a distance acquisition device.

The processor 62 can be a central processing unit (CPU), a microprocessor, or other data processor chip that performs functions in the electronic device 60.

In one embodiment, the storage device 61 can include various types of non-transitory computer-readable storage mediums. For example, the storage device 61 can be an internal storage system, such as a flash memory, a random access memory (RAM) for the temporary storage of information, and/or a read-only memory (ROM) for permanent storage of information. The storage device 61 can also be an external storage system, such as a hard disk, a storage card, or a data storage medium.

The storage device 61 stores instructions, the processor 62 executes the computer program stored in the storage device 61 for implementing the method for estimating depth provided in the embodiments of the present disclosure. The computer program is a depth estimation program and includes instructions.

Upon execution of the instructions stores in the storage device 61, the processor 62 is configured to: obtain a first image; input the first image into a pre-trained depth estimation model, and obtain a first depth image; obtain a depth ratio factor; obtain depth information of the first depth image according to the first depth image and the depth ratio factor.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for estimating depth implemented in an electronic device comprising:
   obtaining a first image;

inputting the first image into a depth estimation model, and obtaining a first depth image;
obtaining a depth scale factor, the depth scale factor indicating a relationship between a relative depth and a depth of each pixel in the first depth image;
obtaining external parameters between a camera device and a radar;
obtaining a second image captured by the camera device and a three-dimensional point cloud image obtained by the radar;
converting the three-dimensional point cloud image into a two-dimensional image according to the external parameters;
inputting the second image into the depth estimation model, and outputting a second depth image;
calculating a depth scale relationship according to the two-dimensional image and the second depth image; and
calculating the depth scale factor according to the depth scale relationship; and
obtaining depth information of the first depth image according to the first depth image and the depth scale factor.

2. The method according to claim 1, wherein obtaining a depth scale factor comprises:
obtaining a distance between a pixel point and the camera device, and determining the distance to be the depth of the pixel point;
calculating a ratio between the relative depth of the pixel point and the depth value of the pixel point, and obtaining the depth scale relationship of the pixel; and
obtaining the depth scale factor according to the depth scale relationship of the pixels.

3. The method according to claim 2, wherein obtaining a distance between a pixel point and the camera device comprises:
obtaining the distance between the pixel point and the camera device by the radar.

4. The method according to claim 3, wherein obtaining the distance between the pixel point and the camera device by the radar comprises:
obtaining a three-dimensional point cloud image scanned by the radar corresponding to the first image;
obtaining external parameters between the camera device and the radar; and
converting the three-dimensional point cloud image into a two-dimensional image according to the external parameters, the two-dimensional image comprising the depth values.

5. The method according to claim 1, wherein calculating a depth scale relationship according to the two-dimensional image and the second depth image comprises:
obtaining the depth value corresponding to the pixel in the second depth image according to the two-dimensional image;
calculating the depth scale relationship of the pixel point according to the depth value corresponding to the pixel point and the relative depth of the pixel point;
obtaining the depth scale relationship of all pixels in the second depth image; and
calculating the depth scale factor according to the depth scale relationship of all the pixels.

6. The method according to claim 5, wherein calculating the depth scale factor according to the depth scale relationship of all the pixels comprises:
obtaining the depth scale relationship of all the second images; and calculating the depth scale factor according to the depth scale relationship of all the second images.

7. An electronic device comprising:
at least one processor; and
a storage device coupled to the at least one processor and storing instructions for execution by the at least one processor to cause the at least one processor to:
obtain a first image;
input the first image into a depth estimation model, and obtain a first depth image;
obtain a depth scale factor, the depth scale factor indicating a relationship between a relative depth and a depth of each pixel in the first depth image;
obtain external parameters between a camera device and a radar;
obtain a second image captured by the camera device and a three-dimensional point cloud image obtained by the radar;
convert the three-dimensional point cloud image into a two-dimensional image according to the external parameters;
input the second image into the depth estimation model, and output a second depth image;
calculate a depth scale relationship according to the two-dimensional image and the second depth image; and
calculate the depth scale factor according to the depth scale relationship; and
obtain depth information of the first depth image according to the first depth image and the depth scale factor.

8. The electronic device according to claim 7, wherein the at least one processor is further caused to:
obtain a distance between a pixel point and the camera device, and determine the distance to be the depth of the pixel point;
calculate a ratio between the relative depth of the pixel point and the depth value of the pixel point, and obtaining the depth scale relationship of the pixel; and
obtain the depth scale factor according to the depth scale relationship of the pixels.

9. The electronic device according to claim 8, wherein the at least one processor is further caused to:
obtain the distance between the pixel point and the camera device by the radar.

10. The electronic device according to claim 9, wherein the at least one processor is further caused to:
obtain a three-dimensional point cloud image scanned by the radar corresponding to the first image;
obtain external parameters between the camera device and the radar; and
convert the three-dimensional point cloud image into a two-dimensional image according to the external parameters, the two-dimensional image comprising the depth values.

11. The electronic device according to claim 7, wherein the at least one processor is further caused to:
obtain the depth value corresponding to the pixel in the second depth image according to the two-dimensional image;
calculate the depth scale relationship of the pixel point according to the depth value corresponding to the pixel point and the relative depth of the pixel point;
obtain the depth scale relationship of all pixels in the second depth image; and
calculate the depth scale factor according to the depth scale relationship of all the pixels.

12. The electronic device according to claim 11, wherein the at least one processor is further caused to:
- obtain the depth scale relationship of all the second images; and
- calculate the depth scale factor according to the depth scale relationship of all the second images.

13. A non-transitory computer-readable storage medium having instructions stored thereon, when the instructions are executed by a processor of an electronic device, the processor is configured to perform a method for estimating depth, wherein the method comprises:
- obtaining a first image;
- inputting the first image into a depth estimation model, and obtaining a first depth image;
- obtaining a depth scale factor, the depth scale factor indicating a relationship between a relative depth and a depth of each pixel in the first depth image;
- obtaining external parameters between a camera device and a radar;
- obtaining a second image captured by the camera device and a three-dimensional point cloud image obtained by the radar;
- converting the three-dimensional point cloud image into a two-dimensional image according to the external parameters;
- inputting the second image into the depth estimation model, and outputting a second depth image;
- calculating a depth scale relationship according to the two-dimensional image and the second depth image; and
- calculating the depth scale factor according to the depth scale relationship; and
- obtaining depth information of the first depth image according to the first depth image and the depth scale factor.

14. The non-transitory storage medium according to claim 13, wherein obtaining a depth scale factor comprises:
- obtaining a distance between a pixel point and the camera device, and determining the distance to be the depth of the pixel point;
- calculating a ratio between the relative depth of the pixel point and the depth value of the pixel point, and obtaining the depth scale relationship of the pixel; and
- obtaining the depth scale factor according to the depth scale relationship of the pixels.

15. The non-transitory storage medium according to claim 14, wherein obtaining a distance between a pixel point and the camera device comprises:
- obtaining the distance between the pixel point and the camera device by the radar.

16. The non-transitory storage medium according to claim 15, wherein obtaining the distance between the pixel point and the camera device by a radar comprises:
- obtaining a three-dimensional point cloud image scanned by the radar corresponding to the first image;
- obtaining external parameters between the camera device and the radar; and
- converting the three-dimensional point cloud image into a two-dimensional image according to the external parameters, the two-dimensional image comprising the depth values.

17. The non-transitory storage medium according to claim 13, wherein calculating a depth scale relationship according to the two-dimensional image and the second depth image comprises:
- obtaining the depth value corresponding to the pixel in the second depth image according to the two-dimensional image;
- calculating the depth scale relationship of the pixel point according to the depth value corresponding to the pixel point and the relative depth of the pixel point;
- obtaining the depth scale relationship of all pixels in the second depth image; and
- calculating the depth scale factor according to the depth scale relationship of all the pixels.

* * * * *